Dec. 13, 1966   C. L. FENDER   3,290,980
BRIDGE CONSTRUCTIONS FOR GUITARS
Filed Feb. 24 1965   5 Sheets-Sheet 1

INVENTOR.
CLARENCE L. FENDER
BY
*Janseurtz & Carr*
ATTORNEYS.

Dec. 13, 1966  C. L. FENDER  3,290,980
BRIDGE CONSTRUCTIONS FOR GUITARS
Filed Feb. 24 1965  5 Sheets-Sheet 2

INVENTOR.
CLARENCE L. FENDER
BY
Jansewitz & Carr
ATTORNEYS.

INVENTOR.
CLARENCE L. FENDER
ATTORNEYS

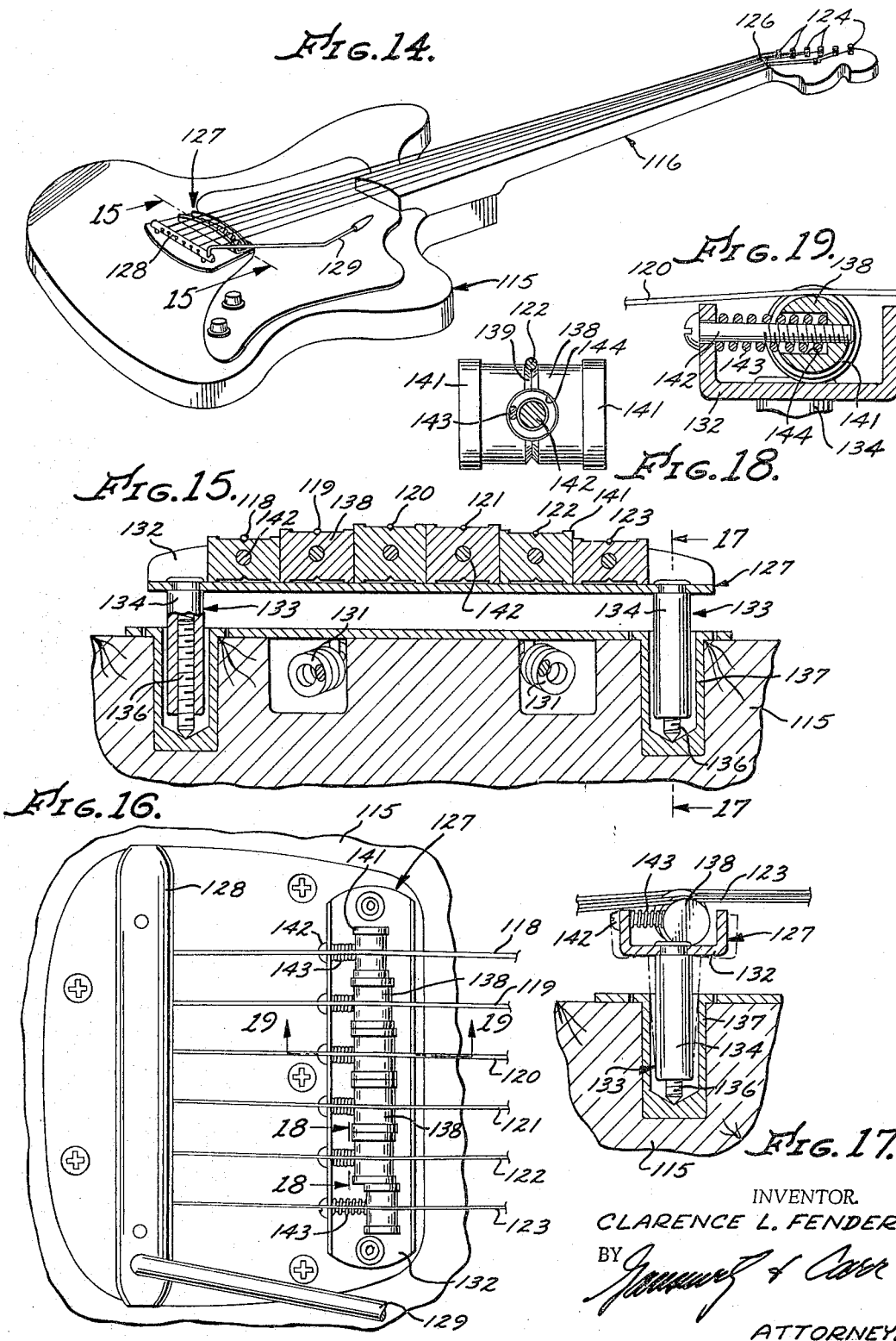

United States Patent Office 3,290,980
Patented Dec. 13, 1966

3,290,980
BRIDGE CONSTRUCTIONS FOR GUITARS
Clarence L. Fender, Fullerton, Calif., assignor, by mesne assignments, to Columbia Records Distribution Corp., New York, N.Y., a corporation of New York
Filed Feb. 24, 1965, Ser. No. 439,506
41 Claims (Cl. 84—307)

This application is a continuation-in-part of patent application Serial No. 304,558, filed August 26, 1963, for Bridge for Acoustic Stringed Instrument and now abandoned.

This invention relates to guitars and the like, and to adjustable bridge constructions therefor.

An object of the invention is to provide an acoustic guitar incorporating an adjustable bridge which does not adversely affect the quality of the generated sound, being adapted to adjust individually the length of each string to thereby assure that the correct pitch will be attained at each fret position of the guitarist's fingers. Such bridge for acoustic guitars is light in weight, simple in construction and operation, and imposes only negligible torque on the vibrating face of the guitar body.

Another object of the invention is to provide a twelve-string single-neck electric guitar incorporating an adjustable bridge which is operative to precisely determine the length of each of the twelve individual strings, and also to determine the elevations of such strings and the exact spacings therebetween. Such bridge is simple to construct and operate, and is highly practical and effective for the indicated purposes.

A further object is to provide a six-string electric guitar incorporating adjustable bridge elements which are very stable, and which may be employed in conjunction with a vibrato means. The indicated bridge elements are individually spring biased in such manner that a high degree of adjusting movement is permitted.

These and other objects will become apparent from the following detailed description taken in connection with the accompanying drawings in which:

FIGURE 3 is a transverse view taken along line 3—3 of FIGURE 2, illustrating the means for adjusting the barrels;

FIGURE 11 is a longitudinal sectional view taken generally on line 11—11 of FIGURE 9;

FIGURE 12 is a transverse section on line 12—12 of FIGURE 8;

FIGURE 14 is a perspective view of a six-string electric guitar, incorporating a third embodiment of the adjustable bridge;

FIGURE 15 is an enlarged transverse section on line 15—15 of FIGURE 14;

FIGURE 16 is an enlarged fragmentary top plan view of the bridge portion of the guitar of FIGURE 14;

FIGURE 17 is a fragmentary sectional view taken on line 17—17 of FIGURE 15; and

Figure 1:
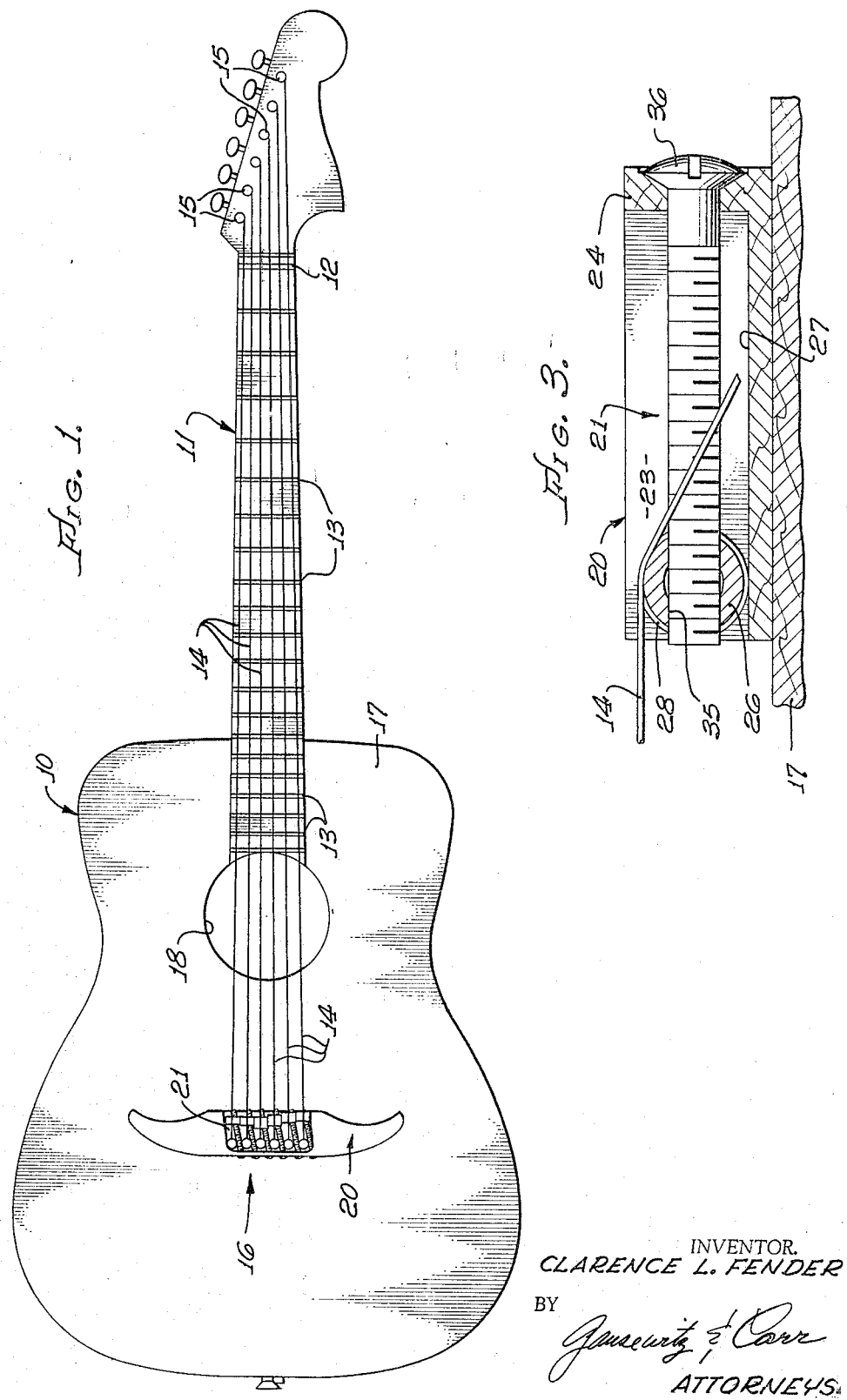
FIGURE 1 is a top plan view of an acoustic guitar incorporating a first embodiment of the adjustable bridge of this invention.

FIGURES 18 and 19 are fragmentary sectional views taken, respectively, on lines 18—18 and 19—19 of FIGURE 16.

Various aspects of the present invention are applicable to either or both electric and acoustic guitars, and similar stringed instruments, having various numbers of strings. Thus, the description of a feature of the invention relative to a particular type of guitar (such as six-string, twelve-string, acoustic or electrical) does not preclude use of such feature on another type of guitar. Certain components of the invention will first be described as embodied in an acoustic guitar, FIGURES 1–7. Thereafter, some of the same, and other, components will be described as embodied in a twelve-string single-neck electric guitar, FIGURES 8–13. Finally, certain components will be described (FIGURES 14–19) as incorporated in a six-string electric guitar embodying vibrato means.

EMBODIMENT OF FIGURES 1–7

For faithful tone quality the bridge of an acoustic guitar should be light in weight and transmit string vibrations to the guitar body directly, without damping or the imposition of extraneous vibrations. The effective string length must be closely controlled in order that the instrument will have the correct octave adjustment. In making this adjustment the length of each string is set so that the twelfth fret of the guitar is positioned at the mid-point of the string. When this is done, it is known that all other frets are properly positioned with respect to the string length. In establishing whether the instrument has proper octave adjustment, the musician will pluck the string and then touch it gently immediately above the position of the twelfth fret. Then the string is held down against the twelfth fret and plucked again. The same note should sound when the string is plucked for the second time as occurred when the string initially was touched above the twelfth fret. If the notes are not precisely the same, the string does not have correct octave adjustment.

Conventionally, no adjustment provision has been made for acoustic guitars and, regardless of the efforts to construct guitars having a proper relationship between the frets and the strings, it has been virtually impossible to achieve ideal results on a production basis. The fact that individual strings will exhibit slightly different characteristics has contributed to the inability to construct instruments of high quality where there is no adjustability for the string lengths.

The present embodiment provides an improved bridge design wherein the string lengths are readily adjustable with extreme precision. The bridge is of low mass and is devised to apply negligible torque to the body face of the guitar. Vibrations are applied directly to the face of the instrument and not through a series of layers or connecting elements. This is accomplished through the use of a short barrel for each string, these elements being held in an end-to-end relationship and bearing directly against the bridge base. The barrels are preferably hollow and, consequently, light in weight. Each string passes over one of the barrels and is secured immediately behind it so that little torque is imposed. An adjusting screw is provided for each of the barrels, extending transversely of each barrel and at an acute angle with respect to the axis of the barrel. By rotating the screw, therefore, the position of the barrel with respect to the string can be varied and the effective length of the string can be controlled.

With reference to FIGURE 1 of the drawings, there may be seen a flat-top acoustic guitar having a hollow wooden body 10 from which extends a neck 11. A fixed bridge 12 is located near the outer end of the neck 11, inwardly of which are the usual frets 13 which are appropriately spaced longitudinally of the neck. A plurality of steel strings 14 extend from the tuning pegs 15 across the bridge 12 and above the frets 13 to the adjustable bridge 16 mounted on the top face 17 of the instrument, which face serves as a diaphragm in the generation of the sound by the guitar. The strings 14 pass over a sound opening 18 between the frets 13 and the bridge 16.

The bridge 16 includes a wooden base member 20 bonded to the top face 17 of the instrument generally transversely of the strings 14. The base 20 is provided with a central recess 21 that opens toward the neck 11 and includes parallel side walls 22 and 23. These walls connect with end wall 24 but are positioned at a slight angle to the end wall. In other words, with the exception of the rounded inner corners, the recess 21 is substantially in the shape of a parallelogram but is not rectangular.

Located within the recess 21 between end walls 22 and 23 are barrels 26. These are hardened steel sleeves, the centers of which have been drilled out. Hence, the sleeves are strong and rigid but light in weight. These sleeves are strong and rigid but light in weight. These sleeves define right cylinders and are arranged in end-to-end contacting relationship. The outermost barrels of the group engage the end walls 22 and 23. All of the barrels 26 rest upon the bottom wall 27 of the bridge base 20.

Each of the barrels 26 may include a plurality of circumferentially extending grooves 28. For convenience and economy of manufacture, the grooves 28 may be in the form of a continuous helix, such as conventional screw threads.

Each string extends over one of the barrels, being received in a groove 28 where it engages the barrel. From the barrel the string passes through an aperture 29 in the bottom wall 27 of the recess 21 and a corresponding opening 30 in the face wall 17 of the instrument. The end of the string is passed around a short tubular retainer, or eyelet, 32 and then twisted back around the portion of the string adjacent the retainer 32, to form an attachment. A peg 33, which may be of plastic material, is inserted into the openings 29 and 30, preventing escape of the tubular retainer 32 and thereby holding the end of the string to the instrument. A groove 34 is included in the forward side of the pin 33 where it engages the retainer 32. It should be noted that the string ends are in this manner secured to the instrument immediately adjacent the barrels 26.

Each of the barrels includes a transversely-extending threaded opening 35 adapted to receive an adjusting screw 36. The transverse opening in each barrel 26 is not perpendicular to the axis of the barrel, being instead inclined so as to form an acute angle with respect to the axis. This permits each adjusting screw to enter an associated barrel at one side of the axial midportion of such barrel, and on the rear side thereof. The head ends of the screws 36 are received within countersunk openings at the end wall 24 of the bridge base 20. Such end wall 24 forms a screw-mounting means.

The resulting construction produces several major advantages with regard to the tone produced by the guitar, and relative to the string length adjustment. In the first place, all components of the bridge are of lightweight construction, yet have considerable strength so that the vibrations of the strings will be imparted to the diaphragm 17 without attenuation due to moving an excessive mass in the bridge unit. The strings are attached by the pegs 33 immediately in back of the barrels so that there is a very low torque load imposed on the bridge from the connections in back of the bridge. Spacing of the connecting points to the rear would result in a sizable moment arm, and would have an adverse effect upon the quality of the instrument.

Moreover, the barrels rest directly upon the bridge base 20 which, in turn, is bonded to the face of the instrument. Hence, vibrations are applied directly to the instrument face without attenuation by passing through various elements. There is no metal-to-metal contact between the barrels and the instrument face, and instead the barrels bear against the wooden bridge surface 27.

Furthermore, the barrels are readily movable so that the octave adjustment of the instrument can be effected easily and with great precision. Simply by rotating the adjusting screws 36, which are accessible from the rear of the bridge away from the strings, the relative positions of the barrels may be varied. The length of possible adjustment is large. String length is such a critical factor that it is important to have adjustability within very precise increments of length. This is no problem with the present construction because the screws 36 may be rotated a fraction of a turn when needed in order to effectuate fine adjustment.

The angularity of the shanks of the adjusting screws 36 permits the screws to pass through the rear wall 24 of the bridge base 20 with their heads engageable from outside the recess 21. With the screws at a shallow angle with respect to the strings, and entering the barrels 26 at one side of the strings, the screws can extend past the retaining pins 33 which are aligned with the strings. Adjustment is accomplished much more easily as a result of this construction because the strings do not impede access to the adjusting screws.

The fact that the barrels are in contacting end-to-end relationship and are restrained by the ends 22 and 23 (which form abutment surfaces) of the recess 21 means that they are held firmly in the direction transversely of the strings. Although the barrels normally will not be axially aligned when the adjustments are made, they do not lose contact with each other. Hence, with the string ends held within the circumferential grooves 28, the string ends are rigidly secured.

Figure 2:
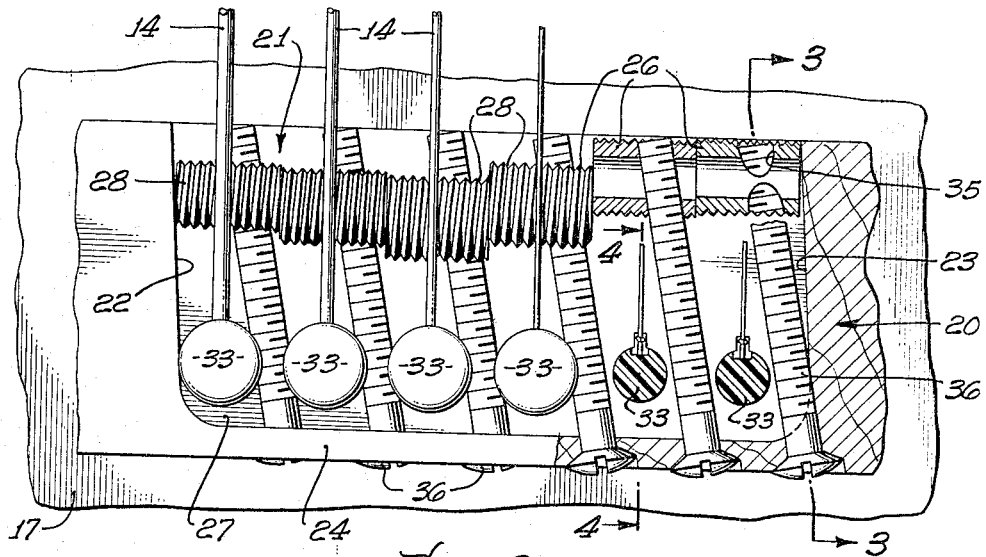
FIGURE 2 is an enlarged fragmentary plan view, partially in section, of the bridge.

String height is controlled by selecting barrels 26 of appropriate diameter. This accurately positions each string vertically with respect to the instrument, without the necessity of additional adjustment means. Barrels of differing diameters are illustrated in FIGURE 2 of the drawings. All the barrels are of the same length, however, to assure contact across the width of the recess in the bridge base.

It is to be understood that the strings are preferably at different heights because they lie along the surface of an imaginary large-diameter cylinder, such imaginary cylinder being generally concentric with the upper surface of the fret board. The upper fret board surface is curved, as viewed in section.

Figures 4, 6:
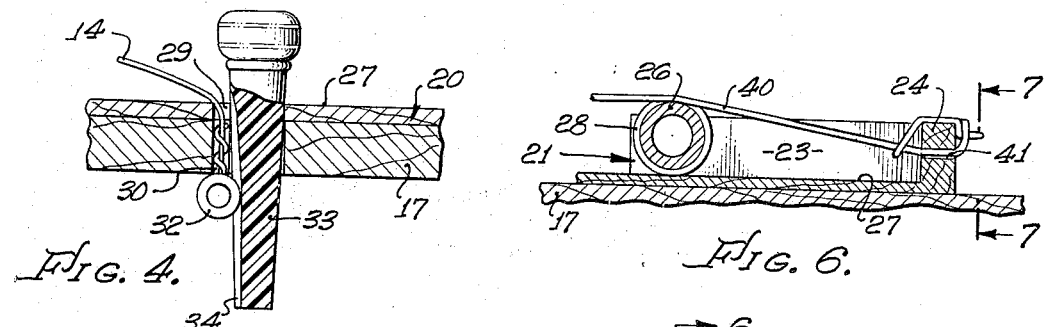
FIGURE 4 is an enlarged transverse sectional view taken along line 4—4 of FIGURE 2, showing the manner in which the pin holds the ends of the strings.
FIGURE 6 is a transverse sectional view taken along line 6—6 of FIGURE 5, showing the manner in which the strings of the instrument of FIGURE 5 pass over the barrels and are retained at their ends by the bridge.
Figure 5:
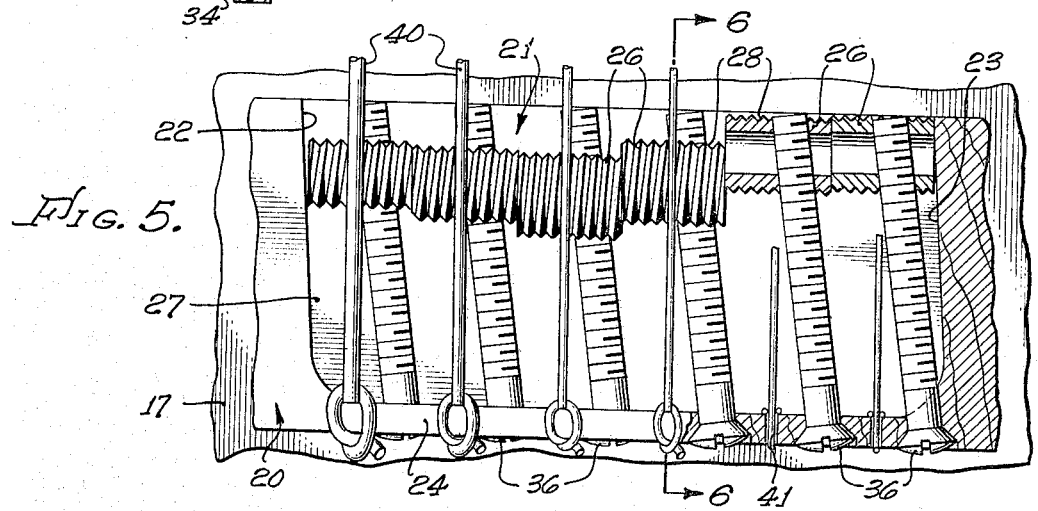
FIGURE 5 is an enlarged fragmentary plan view which is similar to FIGURE 2 but shows the bridge as utilized in classical guitars.
Figure 7:
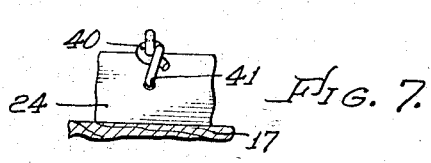
FIGURE 7 is a sectional view taken along line 7—7 of FIGURE 6, further illustrating the retaining of the string ends.

For classical guitars, where gut, silk or synthetic strings are employed, it is generally considered unsatisfactory to secure the strings by means of a pin as described above relative to steel strings. Accordingly, the strings of the classical instruments normally will be tied in place, rather than secured by a pin. As seen in FIGURES 5, 6 and 7, therefore, the strings 40 extend to the rear wall 24 of the bridge, where they are tied in place to effect the attachment. Apertures 41 are provided in the rear wall to accommodate the strings 40 aand permit them to be looped around the top edge portion of the wall. The strings 40 pass over the adjustable barrels 26 exactly as did the strings 14. Again, the axially fixed adjusting screws 36 can position the barrels axially with respect to the strings so that the effective string lengths may be controlled. The screws are easily reached from the exterior of the bridge base so that rotation of the screws is accomplished conveniently. As before, the strings pass through the grooves 28 in the barrels, which properly position the strings in the lateral direction. The vibrations of the strings are transmitted directly through the bridge base to the face of the instrument. Additionally, the construction for the classical-type guitar retains the advantages of lightweight components, and simplicity and durability of construction. Hence, it can be seen that the principles of this embodiment are applicable generally in the construction of acoustical stringed instruments. Also, as will next be described, certain features of the embodiment of FIGURES 1–7 are applicable to various electric guitars and the like.

EMBODIMENT OF FIGURES 8–13

The twelve-string single-neck guitar, normally (although not necessarily) an electric guitar, is rapidly achieving a high degree of popularity. Such a guitar incorporates a plurality of pairs or sets of strings, the strings in each pair being normally tuned one octave apart although it is possible (for example, in the treble strings) to tune the strings in each pair to the same pitch or to pitches separated by more or less than an octave. The two strings in each set or pair are conventionally pressed (adjacent a fret) by only one finger of the guitarist.

The previously-indicated problem of achieving the correct string length, and thus the correct octave adjustment, is probably even more critical relative to twelve-string guitars than relative to six-string guitars. This is because the notes played are normally one octave apart, regardless of the fret at which the musician simultaneously places his finger on both strings of a pair. Any deviation from true (normally octave) pitch separation, at any fret along the neck, would be highly noticeable and undesirable. Further important problems relative to twelve-string guitars relate to the maintenance of the precise small spacing between the strings of each pair, and between adjacent pairs of strings, and to the maintenance of the desired string elevation above the fret board. It will be appreciated that, because twelve strings are provided in a space comparable to that previously required for six, the problem of string spacing is highly acute.

Despite the importance of the above problems, the prior art has not achieved a bridge for a twelve-string guitar which simultaneously solved the problems relative to individual adjustment of string length, maintenance of the correct string spacing, and maintenance of the correct string elevation. More particularly, the prior art has not solved these problems with a simple and economical bridge construction which is readily manufactured, installed, and operated.

Figure 8:
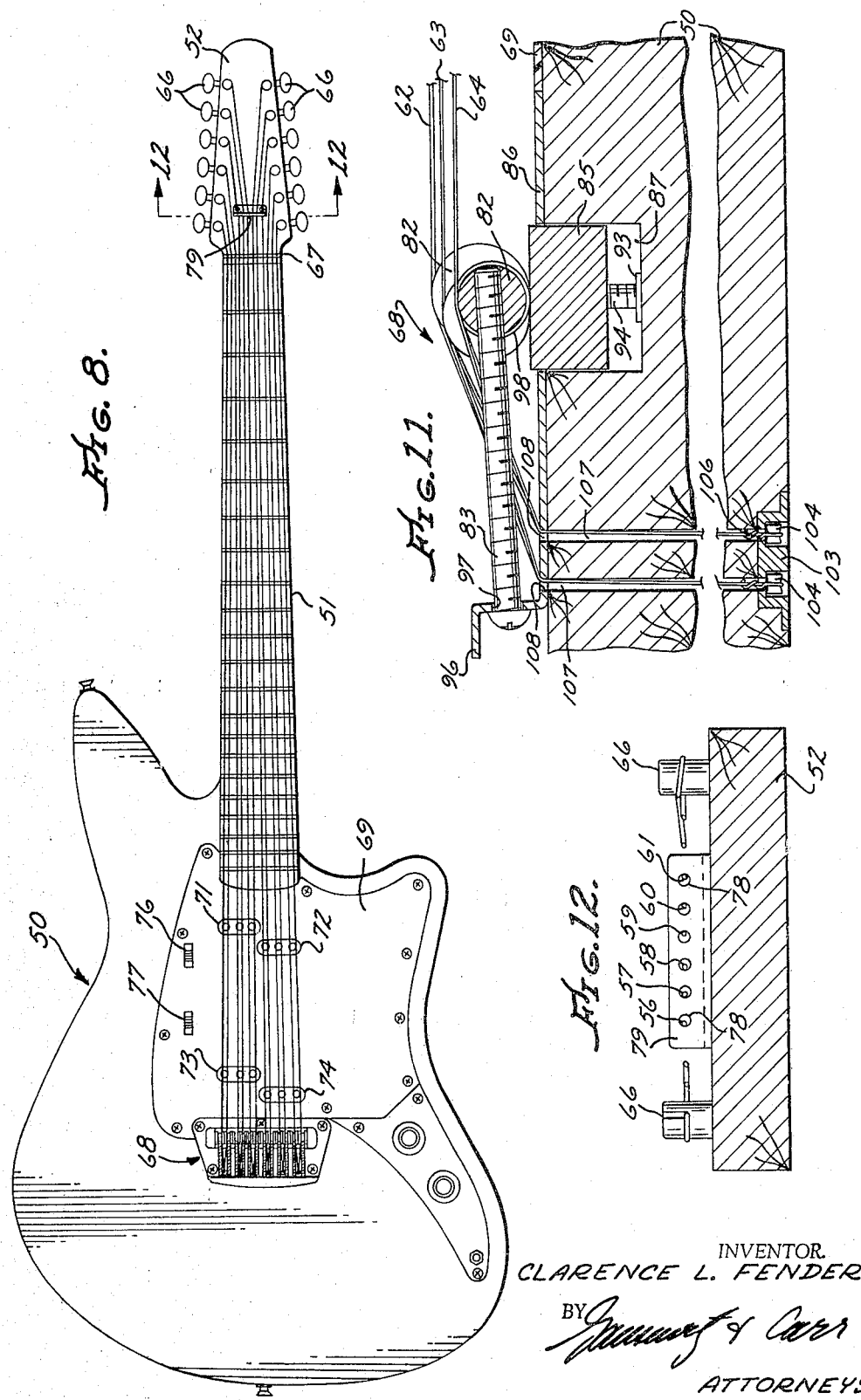
FIGURE 8 is a top plan view of a single-neck twelve-string electric guitar, incorporating a second embodiment of the adjustable bridge of the invention.
Figure 9:
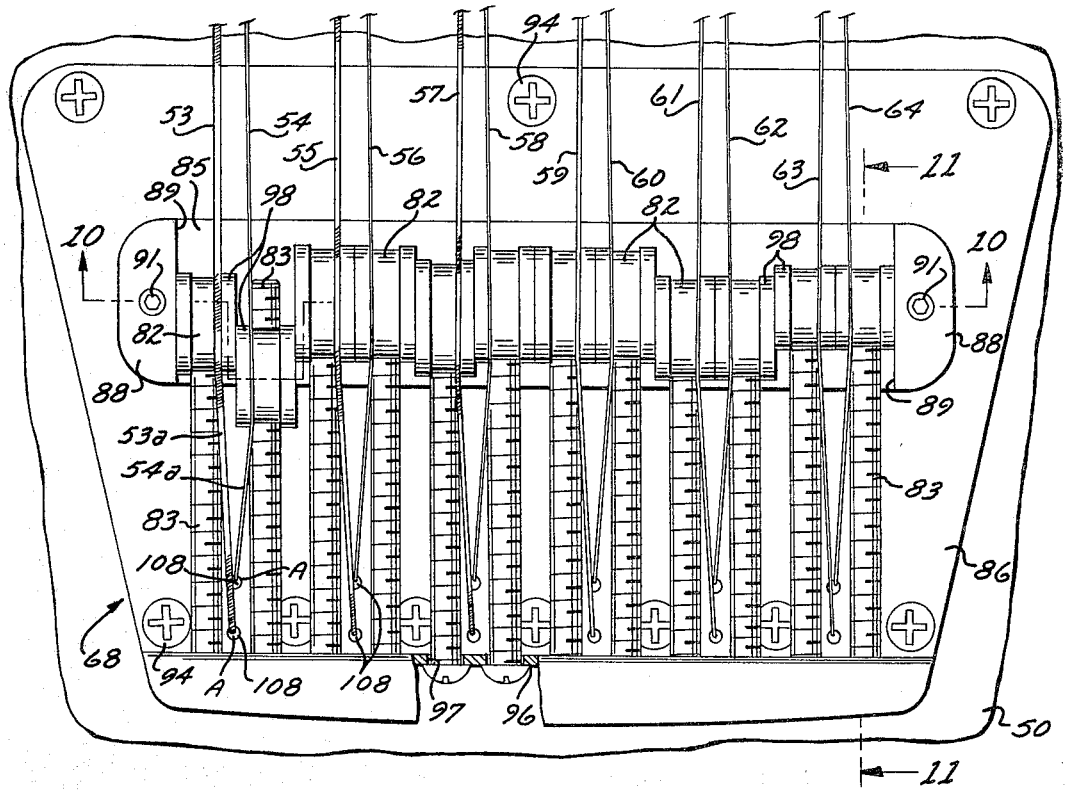
FIGURE 9 is an enlarged fragmentary top plan view showing the bridge portion of the guitar in FIGURE 8.
Figure 10:
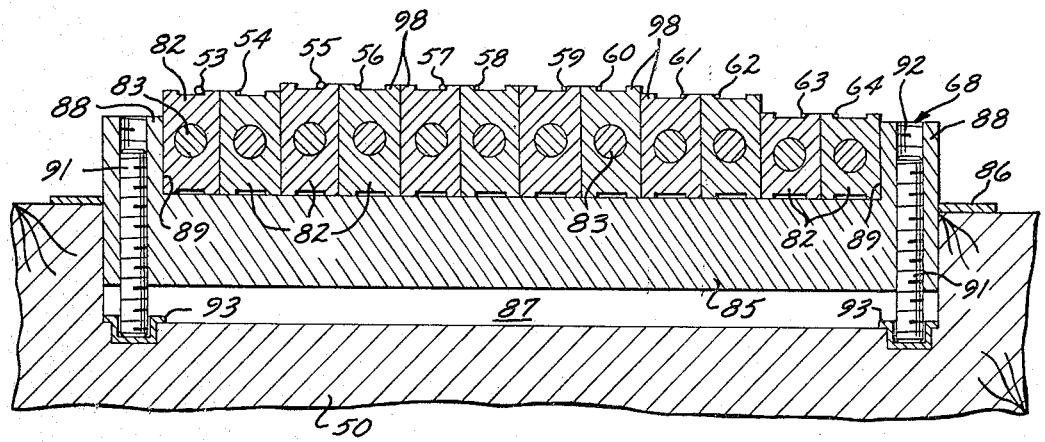
FIGURE 10 is a transverse sectional view, on line 10—10 of FIGURE 9.
Figure 13:
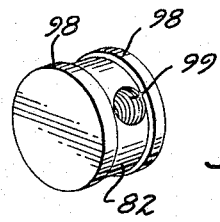
FIGURE 13 is a perspective view of one of the bridge barrels of the guitar of FIGURE 8.

Referring particularly to FIGURE 8 of the drawings, a twelve-string single-neck electric guitar is illustrated and comprises a solid wooden body 50 from which projects a fretted neck 51 having a head 52 at the outer end thereof. Twelve strings, numbered 53–64 in FIGURES 9 and 10, are mounted over the body 50 and neck 51 in tensioned relationship. Stated more specifically, the strings 53–64 extend from tuning screws 66 on head 52 across a fixed bridge 67 and over the neck and body to the adjustable bridge 68 of the present invention.

The strings 53–64 lie generally in a plane parallel to and spaced above the plane which contains the face plate 69 of the guitar body. The term "generally" is employed because (as in other embodiments described herein) the strings, as will be described hereinafter, normally lie on the surface of an imaginary large-diameter cylinder and generally parallel to the rounded (as viewed in section) upper surface of the neck.

In the illustrated electric guitar, the strings are formed of steel and pass over electromagnetic pickup means 71–74 which are suitably mounted to the guitar body and which connect, under control of switches indicated at 76 and 77, to suitable amplifying and loudspeaker means.

The strings are generally parallel to each other, but converge in a direction from the adjustable bridge 68 to the fixed bridge 67. The central six (numbers 56–61) of the strings 53–64 pass, respectively, through six openings 78 in a guide element 79 on head 52, as best shown in FIGURE 12. The strings then extend to the tuning screws 66 which are provided in rows of six at opposite edge portions of the head.

Proceeding next to a detailed description of the adjustable bridge 68, this comprises a bridge base adapted to support a plurality of string-engaging barrels 82, and adjustment screws 83 to shift the individual barrels longitudinally of the strings and thereby change the effective lengths of the strings.

The bridge base is illustrated to comprise two sections, a movable section 85 and a fixed section 86. Movable section 85 comprises a rigid metal element extending transversely to strings 53–64, such element being disposed in a corresponding recess 87 (FIGURES 10–11) which is provided in the guitar body 50. The size of the movable bridge section 85 corresponds to that of the recess, in order that the walls of the recess will serve to restrain the movable section against lateral or longitudinal movement but will permit movement in a direction perpendicular to the plane of the strings.

At the ends of the movable bridge section 85 are provided upwardly-projecting abutments 88 which define inwardly-facing guide surfaces 89. Such surfaces 89 are parallel to each other and perpendicular to the plane of the strings, being also parallel to the neck 51 of the guitar. Such surfaces restrain the barrels 82 against movement laterally of the strings, as was previously indicated relative to the surfaces 22 and 23 described relative to the first embodiment, and as will be stated in detail hereinafter.

In order to effect the desired vertical movement of the movable bridge section 85, adjustment means 91 are provided to either raise or lower such section. The illustrated adjustment means comprise threaded pins which are threaded into internally-threaded bores 92 in abutments 88. The upper ends of such pins are suitably socketed for rotation by a wrench, whereas the lower ends thereof are seated against the guitar body 50. In the illustrated form, the lower pin ends seat in cups or thimbles 93 provided in the guitar body at the bottom of recess 87.

The fixed section 86 of the bridge base is illustrated to comprise a metal plate which is rigidly secured to body 50 by means of a plurality of screws 94. Such plate has an opening which corresponds to the shape of the movable section 85, and also to the shape of the recess 87 in the guitar body. Screw-mounting means 96 are provided at the edge of plate 86 which is remote from the head of the guitar, being formed with oversize openings 97 (FIGURES 9 and 11) which receive the shanks of adjustment screws 83 at points adjacent the screw heads. Openings 97 are sufficiently large to permit a certain amount of pivoting of the screws in response to raising and lowering of movable bridge base section 85.

There will next be given a detailed description of the barrels 82, which barrels comprise important elements of the present invention. Each of such barrels is illustrated in FIGURES 9–11 and 13 to comprise a right cylinder formed of metal or other suitable hard material, and having a flange 98 at each end so that a spool-like shape results. The cylinders or spools are relatively short, the axial dimensions being such that, when disposed in endto-end relationship as illustrated, the combined lengths of twelve cylinders 82 will be only slightly greater than the distance between the strings 53 and 64 most remote from each other. In many cases, the lengths of the spools are substantially smaller than the diameters thereof. Thus, the barrels or spools may also be termed discs.

As previously indicated, the spools are in end-to-end abutment, with the end spools abutting against the interior guide surfaces 89 of fixed abutments 88. Accordingly, and despite the relatively large diameters and short lengths of the spools, there is no possibility that the spools will tip over or will change positions in directions transverse to the strings.

The spools may, as stated heretofore, be adjusted longitudinally of the strings, in order to change the string lengths as desired, by merely rotating the adjustment screws 83 which are threaded through internally-threaded bores 99 (FIGURE 13) formed diametrically of the spools midway between the flanges thereof. As best shown in FIGURE 9, the shanks of the adjustment screws 83 extend longitudinally of the operative playing portions (the portions between the barrels 82 and the fixed bridge 67) of the strings 53-64.

The flanges 98 at the barrel ends perform at least two major functions. The first of such functions is to achieve and maintain the precise desired spacing (separation) between the strings in each pair thereof, such strings being normally tuned to a pitch separation of one octave (as previously indicated). The indicated string pairs or sets comprise strings 53-54, 55-56, 57-58, 59-60, 61-62, and 63-64. Such desired separation between the strings in each pair is preferably achieved by making the width of each flange 98 (in a direction axially of the barrel, or transversely of the strings) equal to one-half the desired string spacing. It is pointed out that the radial dimensions of the flanges 98 are sufficiently greater than the radial dimensions of the portions of barrels 82 between the flanges to insure (when the string ends are caused to converge, as will be described) that each string 53-64 will engage its associated barrel at the intersection or apex between the intersecting interior flange surface and the cylindrical barrel surface.

A second major function of the flanges 98 is to provide the desired two-point contact between each barrel 82 and the movable bridge base section 85 therebeneath. Because of the vertical adjustment of the movable section 85 effected by pins 91, the exact two points (where the flanges 98 of a particular spool or barrel 82 engage the upper surface of base section 85) will vary somewhat in accordance with the elevated or depressed condition of base section 85 relative to guitar body 50. The flanges 98 provide the desired support regardless of the vertical position of the bridge base section 85, and (in combination with the abutment surfaces 89, and the abutting surfaces of adjacent barrels) insure that the support for each of the strings will be of a highly stable nature.

There will next be described a relationship whereby the precise desired spacing or separation is maintained between the strings of each pair thereof despite the shifting of each barrel longitudinally of the strings. This is effected by anchoring the ends of the strings in each pair 53-54, 55-56, etc., between screw-mounting means 96 and barrels 82, and generally in a plane (hereinafter termed the "reference plane") which is perpendicular to the plane of the strings and passes (generally parallel to neck 51) intermediate the two strings of each pair. Thus, for example, one such plane in which the string ends are anchored (at anchor points A, FIGURE 9) is a plane midway between strings 53-54 and containing the interface between the two abutting spools 82 which are shown at the extreme left in FIGURE 9. Such anchor points preferably lie on the face of guitar body 50.

Because of the indicated positioning of the string ends, the short, inoperative string portions (lying between the barrels and the anchor points) converge toward each other (and toward the indicated reference plane) in a direction away from the head of the guitar. Thus, for example and relative to the two strings shown at the left in FIGURE 9, the indicated inoperative string portions 53a and 54a lie at acute angles relative to the reference plane and relative to the operative playing portions 53 and 54 of the strings, the angles being such that the string portions 53a and 54a converge in substantial degree.

The described convergence of the inoperative string ends (such as 53a and 54a) lying between the bridge barrels 82 and the guitar body produces at least two major desired results. In the first place, such convergent relationship assures that the precise spacing will be maintained between the operative playing portions (such as 53 and 54) regardless of the adjusted positions of the barrels 82. In this regard, it is to be noted that the angle between each short and inoperative string section (such as 53a or 54a) and the specified reference plane becomes greater as the associated barrel moves toward the screw-mounting means 96, and becomes less as the barrel moves toward the head of the guitar. Regardless of such change in angularity, however, the separation between the operative string portions (such as 53 and 54) in each set or pair of strings remains equal to the combined thicknesses of the spool flanges 98.

The resulting predetermined spacing between the operative playing portions of the strings is to be contrasted to the spacing which would occur if the operative and inoperative portions of each string were exactly in line (as viewed from above, FIGURE 9) as is the conventional situation. In such a construction, there would be no positive way of assuring that the strings would maintain the precise desired separation, making it possible for factors such as friction, movement of the strings in response to vibration thereof, etc., to change the string spacing.

The second of the above-indicated major advantages resulting from convergence of the inoperative short string portions (such as 53a and 54a) toward the specified reference plane is that the string ends may then be anchored to the body at points (such as A, FIGURE 9) between adjustment screws 83, without danger that the screws will be contacted by the string portions. It is desired that the inoperative string portions 53a and 54a be maintained as short as possible, in order to minimize generation of the higher-order harmonics resulting from sympathetic vibration. Furthermore, it is desired that the entire bridge construction 68 be maintained as compact and unobtrusive as possible. These and other advantageous results are achieved by the present invention, without impeding in any way the accessibility of the heads of adjustment screws 83 while the strings 53-64 are in mounted condition.

It is emphasized that the screw heads must be readily accessible to the screwdriver while the strings are mounted, or else the specified octave adjustments may not be made. Because the string ends are anchored between the shanks of the screws 83, there is no interference between the string ends and the shanks of the screws, or between the string ends and a screw-driver turning the heads of the screws.

It is pointed out that the lateral forces (transversely of the strings) generated by the bending of the strings to effect the indicated convergence thereof toward the anchor points are largely canceled out or neutralized at the interfaces between the abutting barrels 82, so that the thrusts exerted against the stationary guide surfaces 89 are not excessive. This is particularly true relative to the higher-pitched strings (such as 63 and 64) tuned to the same pitch, so that the lateral forces cancel substantially completely at the interfaces between the barrels on which such strings are supported.

It is also to be noted that the string pairs are disposed relatively far from each other at regions adjacent the adjustable bridge 68, but (as shown in FIGURE 8) are relatively close to each other at the fixed bridge 67. In other words, the string pairs converge in a direction from the adjustable bridge toward the fixed bridge, but the strings in each pair do not converge substantially.

The spacing, at points relatively adjacent the adjustable bridge 68, between each string pair (such as 55–56) and the adjacent string pairs (such as 53–54 and 57–58) is a natural result of the present invention. The string anchor points (such as A, FIGURE 9) are provided only in alternate gaps or spaces between the shanks of adjustment screws 83. Thus, string 55, for example, is urged toward string 56 but away from string 54, thereby resulting in a very substantial space between strings 54 and 55. Such separation between the string pairs facilitates strumming (or picking), or other manipulation thereof by the fingers of the guitarist.

Anchoring of the string ends to the guitar body may be achieved in various ways, the preferred way being shown in FIGURE 11. As is there illustrated, a socket plate 103 is recessed into the lower surface of the guitar body 50, being adapted to receive eyelets 104 which are secured at the ends of the guitar strings. Each string extends from the associated eyelet through an opening 106 in the socket plate, a bore 107 in the guitar body, and an opening 108 in the fixed section 86 of the bridge base. Thus, the string ends are rigidly secured to the guitar body, and in the above-indicated desired relationship by which the anchor points lie in the specified reference planes. It is pointed out that the indicated anchor points (such as A, FIGURE 9) are adjacent the openings 108 in bridge component 86, it being understood that the bores 107 may be made oblique, and the plate 103 shifted to various positions, if desired.

Proceeding next to a description of the manner of employing the present invention to effect precise adjustments of string spacing and string elevation, it will be appreciated that the exact distance between the two strings (such as 53 and 54) in each pair or set thereof may be regulated by merely substituting barrels 82 having flanges 98 of desired widths. Thus, for example, if a particular guitarist desires to decrease slightly the separation distance between the strings in each pair, he may readily remove the illustrated barrels 82 and substitute therefor barrels having flanges 98 which are slightly narrower than those illustrated. In a similar manner, the spacing between adjacent pairs of strings may be regulated.

Determination of string elevation above the face of the guitar body, and above the fret board, is determined in the following two ways, in combination: (1) by selecting barrels 82 having different diameters, and (2) by employing the adjustment pins 91 to raise and lower the movable component 85 of the bridge base. Referring particularly to FIGURE 10, it will be noted that the illustrated strings 53–64 lie generally on the surface of the imaginary large-diameter cylinder previously indicated. It is to be understood that, although the strings in each pair illustrated in FIGURE 10 are disposed on barrels of the same diameters, it is within the scope of the invention to cause one string in each pair (such as 53–54) to be supported on a barrel of predetermined diameter, and the second string in each pair to be disposed on a barrel of larger or smaller diameter. This may accomplish the result of causing the unwound string 54, for example, to be raised (at the area where the strings are picked or strummed) to the same elevation as the wound string 53.

Raising and lowering the bridge base component 85 by means of the threaded pins 91 is extremely desirable in that it greatly increases the range of adjustment and, furthermore, permits all of the strings to be simultaneously raised and lowered as described (for example, when the neck is adjusted by means of the truss rod normally incorporated therein).

The flanges 98 (and equivalents thereof) on the individual bridge elements 82 (and equivalents thereof) may be termed "protuberances," "separators," etc.

In the present embodiment, and also in the embodiment of FIGURES 1–7, the short, inoperative string end portions (such as 53a and 54a, FIGURE 9) lie at acute angles relative to the associated adjustment screws when viewed either (or both) from a plane parallel to the plane of the strings (FIGURES 2 and 9) or from a plane which is perpendicular to the plane of the strings and is parallel to the neck (FIGURES 3 and 11). The first-mentioned angular relationship (FIGURES 2 and 9) is believed to be a particularly novel and important feature of the present invention. It is pointed out that, as viewed in FIGURES 2 and 9, the acute angles are such that each screw and the adjacent inoperative string end portion appear to converge in a direction toward the neck and head of the guitar.

The use of the term "inoperative" in the present specification and claims merely denotes the inability to vibrate and generate a desired musical sound. Such term has no relationship to operativeness for other purposes.

EMBODIMENT OF FIGURES 14–19

FIGURES 14–19 illustrate certain aspects of the invention as incorporated in a six-string electric guitar having vibrato means. The bridge construction shown in FIGURES 14–19 is preferably, but not necessarily, utilized in combination with a vibrato device such as the one described and claimed in my copending patent application Serial No. 372,908, filed June 5, 1964, for Guitar Incorporating Inertial Vibrato Device, now Patent No. 3,241,-418. The present bridge is an improvement on the bridge described and claimed in my Patent No. 2,972,923, issued February 28, 1961, for Floating Tremolo and Bridge Construction for Lute-Type Musical Instruments.

As described in detail in the cited issued Patent 2,972,-923, the guitar shown in FIGURE 14 incorporates a body 115, a neck 116, and a head 117. Six steel strings 118–123 are mounted in tensioned relationship over the neck and the body, extending from tuning screws 124 across a fixed bridge 126 to the adjustable bridge 127 of the invention. The ends of the strings 118–123 are anchored to an intertial element 128 forming a major component of the vibrato device described in the cited co-pending patent application. Such inertial element 128 is adapted to be pivoted in response to depression or elevation of a handle 129 to thereby change the degree of tension in the strings, with consequent pivoting or rocking of the bridge 127. The vibrato device incorporates spring means 131, FIGURE 15, adapted to interconnect through lever means with the intertial element 128, in order to counteract the tension exerted by the guitar strings.

The bridge 127 is illustrated to comprise a channel member 132 (forming a bridge base) supported on leg or post assemblies 133. Such assemblies 133 include internally-threaded tubular elements 134 which are fixedly secured to opposite ends of the web of channel 132, and externally-threaded pin or screw elements 136 threaded into tubes 134. The upper ends of the pins are socketed for reception of a wrench, so that the elevation of the channel may be adjusted.

The leg or post assemblies 133 extend downwardly into relatively large-diameter sockets or thimbles 137 which are fixedly mounted in the guitar body 115, the relationship being such that the lower pointed ends of screw elements 136 seat in conical apex portions at the bottoms of the thimbles. Because of the relatively large diameters of the sockets 137, the bridge 127 may pivot (as indicated previously and as shown in FIGURE 17) in response to lengthening or shortening of the strings 118–123 as the handle 129 is actuated.

The bridge assembly further comprises a plurality of barrels or spools 138 mounted longitudinally on the web of channel 132 and each adapted to support one of the guitar strings 118–123. Preferably, but not necessarily, a groove 139 (FIGURE 18) is formed in the mid-portion of each barrel 138 in order to position the associated guitar string.

A flange 141 is formed at each end of each of the barrels or spools 138, and provides the above-stated important effect of increasing the stability of the barrels in that a two-point support is provided. The barrels are mounted in end-to-end relationship, as shown best in FIGURES 15 and 16.

It is a feature of the invention that spring means are provided to maintain the barrels 138 in the precise positions to which they are adjusted by screws indiacted at 142. Such screws extend through openings in one of the flanges of the channel 132, being threaded diametrically into internally-threaded openings in the barrels. The indicated spring means comprises helical compression springs 153 mounted, respectively, around the shanks of screws 142 between barrels 138 and the flange (adjacent inertial element 128) through which the screws project. As shown in FIGURE 19, the ends of the springs seat in deep counterbores 144 which are provided in the barrels 138 around screws 142.

Because of the presence of counterbores 144, the barrels 138 may be adjusted through a very substantial distance toward and away from the associated channel flange, in order to change relatively greatly the operative lengths of the strings 118–123. Thus, for example, it is possible to turn an adjustment screw until its associated barrel 138 is close to the flange through which the screws project. Such a position would not be possible in the absence of the counterbores 144, because the spring could not be compressed to this extent in the short distance between the external surface of the barrel 138 and the adjacent surface of the channel flange.

As in the previous embodiment, the elevation of the strings 118–123 above the face of the guitar body and above the neck is altered by changing the diameters of the barrels 138, and also by rotating the pins 136 to raise or lower the entire channel 132.

It is emphasized that the use of barrels having different diameters, and having flanges at the ends thereof for purposes of stability, results in the generation of a musical tone which is superior to that produced with prior-art adjustable bridges.

The bridge construction described relative to FIGURES 8–13 may in some instances be modified by extending the inoperative string end portions to and even beyond the screw-mounting means 96. This may be desirable when, for example, the string ends are connected to a vibrato device such as the inertial element described and claimed in my co-patent application, Serial Number 372,908, filed June 5, 1964, for a Guitar Incorporating Inertial Vibrato Device, now Patent No. 3,241,418. In such a device, the inoperative end portions of adjacent strings may be disposed in X-relationship (as viewed from above), the strings peing anchored (after crossing each other) substantial distances on opposite sides of the specified reference plane instead of adjacent such plane. Such X-relationship produces the angularity necessary to maintain lateral enyagement with the spool flanges, while permitting the vibrato device to be spaced a substantial distance from the bridge barrels.

The movable bridge support described relative to the embodiment of FIGURES 8–13 may be of the pivotal or rocking type described relative to the embodiment of FIGURES 14–19.

It is to be understood that the embodiments of FIGURES 8–13 and 14–19 may be combined. For example, three treble strings may be provided in accordance with FIGURES 14–19, and six bass strings may be provided in accordance with FIGURES 8–13. The vibrato means (FIGURES 14–19) may be employed if desired, or may be omitted.

The noun "screw," as employed in the present specification and claims, includes bolts and other elongated devices for adjusting bridge elements longitudinally of the strings supported thereby.

The foregoing detailed description is to be clearly understood as given by way of illustration and example only, the spirit and scope of this invention being limited solely by the appended claims.

I claim:

1. In an acoustical stringed instrument having a face and a plurality of strings extending over said face, a bridge for said strings comprising:
   a base member secured to said face of said instrument,
     said base member having a recess means therein facing said strings,
       said recess having opposed side walls,
   a plurality of barrels engaging said base member and disposed in said recess,
     said barrels being in substantially end-to-end engagement with the outermost barrels engaging said side walls of said recess,
     each string passing over one of said barrels and engaging the circumferential surface thereof,
   means securing said strings to said instrument beyond said barrels,
   and adjustable means engaging said barrels for controlling the positions thereof axially with respect to said strings.

2. A device as recited in claim 1, in which said barrels have circumferential groove means therein, each of said strings being received in the groove means of the barrel therefor, each of said barrels having a hollow interior for thereby reducing the mass thereof.

3. A device as recited in claim 1, in which said means for adjusting said barrels includes a screw threadedly received in each barrel transversely of the axis thereof, each screw being rotatable and axially fixed with respect to said base member, said screws being positioned at acute angles with respect to the axes of said barrels, each of said barrels having circumferential groove means therein, each of said strings being received in the groove means of the barrel therefor and being attached to said instrument adjacent and to one side of the adjusting screw therefor, each of said barrels having a hollow interior.

4. In an acoustic guitar having a face and a plurality of strings extending over said face, a bridge for said strings comprising:
   a substantially flat base member bonded to said face,
     said base member having a recess in the upper surface thereof,
       said recess opening toward said strings and having a pair of opposed substantially parallel side walls, an inner end wall interconnecting said side walls, and a bottom wall intermediate said walls,
   a hollow sleeve in said recess for each of said strings,
     the axes of said sleeves being substantially transverse to the axes of said strings,
     each of said sleeves being engaged by the string therefor and bearing against said bottom wall beneath said string,
     said sleeves being in an end-to-end contacting relationship with the end sleeves engaging said side walls,
   means securing said strings to said instrument beyond said sleeves,
   and screw thread means for adjusting the positions of said sleeves axially with respect to said strings.

5. A device as recited in claim 4, in which said screw thread means includes, for each sleeve, a screw having a shank extending through said end wall into said recess, said screw also having a rotatable head facing the outer side of said end wall, each of said shanks being threadedly received by a sleeve and extending substantially transversely thereof, whereby rotation of said head causes said shank to vary the position of said sleeve in said recess.

6. A device as recited in claim 5, in which said shanks are at an acute angle with respect to said strings, each of said shanks entering the sleeve therefor at one side of and beneath the string engaged by said sleeve.

7. A device as recited in claim 6, in which said means securing said strings to said instrument includes an enlargement on the end of each string, said bottom wall and said face having an aperture therethrough for each of said strings, said apertures being in alignment with said strings, said enlargement being on the undersurface of said face, and a pin extending through each of said apertures to preclude withdrawal of said string end therethrough, said apertures being disposed to one side of said shanks.

8. A guitar, which comprises:
a body,
a plurality of guitar strings,
means to mount said guitar strings in tensioned relationship over said body,
    said strings being disposed generally parallel to each other and generally in a single plane,
wall means provided on said body and defining guide surfaces on opposite sides of said strings,
    said guide surfaces being generally parallel to each other and generally perpendicular to said plane of said strings,
a plurality of individual bridge elements supported on said body between said guide surfaces and beneath said strings,
    each of said bridge elements being in contact with one only of said strings,
    said bridge elements being disposed in guiding abutment with each other in a row transverse to said strings,
    said bridge elements at opposite ends of said row being, respectively, in engagement with said guide surfaces for guiding thereby whereby said guide surfaces and bridge elements cooperate with each other to stabilize said bridge elements and prevent movement of any of said bridge elements in a direction transverse to said strings, and
means to effect individual adjustment of said bridge elements longitudinally of said strings to thereby determine the operative length of each individual one of said strings.

9. The invention as claimed in claim 8, in which said bridge elements comprise right cylinders disposed in endwise abutment, and in which said adjustment means comprises a plurality of screws threaded, respectively, through said cylinders in directions transverse to said cylinders, said screws lying generally in a plane parallel to said plane of said strings.

10. A guitar, which comprises:
a body,
a plurality of guitar strings mounted in tensioned relationship over said body,
    said strings having operative playing portions disposed generally parallel to each other and generally in a single plane,
    said strings being anchored to said body at predetermined anchor points,
a plurality of individual bridge elements supported on said body beneath and in engagement with said strings,
    each of said bridge elements being in contact with one only of said strings,
    said bridge elements defining inoperative end portions of said strings between said bridge elements and said anchor points,
    said bridge elements also defining said operative playing portions of said strings on the opposite sides of said bridge elements from said inoperative end portions,
screw-mounting means mounted on said body,
    said screw-mounting means and said inoperative end portions of said strings being located on opposite sides of said anchor points, and
a plurality of screws rotatably mounted in said screw-mounting means,
    said screws having shanks extending, respectively, to said bridge elements,
    the relationship between said screws, said bridge elements and said screw-mounting means being such that rotation of each of said screws effects shifting of an associated bridge element longitudinally of the string supported thereby to thus change the effective length of said operative playing portion of said string,
    said inoperative end portions of said strings and the shanks of said screws being at acute angles relative to each other when viewed from a plane parallel to said plane of said strings,
    at least the majority of said anchor points being disposed between said shanks of adjacent screws,
        whereby said screws are readily accessible when it is desired to adjust string length, and
        whereby said inoperative end portions are maintained very short to thus minimize vibrations therein.

11. The invention as claimed in claim 10, in which said screw shanks are substantially parallel to said operative playing portions of said strings, and in which said inoperative end portions of said strings lie at acute angles to reference planes which are parallel to said operative playing portions of said strings and are perpendicular to said plane of said strings.

12. The invention as claimed in claim 10, in which said inoperative end portion of each string lies generally in the same plane as the connected operative playing portion of such string, said plane being perpendicular to said plane of said strings, and in which said screw shanks lie at acute angles to said planes containing said inoperative end portions.

13. A guitar, which comprises:
a body,
a plurality of guitar strings,
means to mount said guitar strings in tensioned relationship over said body,
    said strings being disposed generally parallel to each other and generally in a single plane, and
a plurality of individual bridge barrels supported on said body beneath said strings,
    the axes of said barrels being generally parallel to said plane of said strings,
    each of said bridge barrels being in contact with one only of said strings,
    the bridge barrels for different ones of said strings having different diameters whereby to vary the elevations of said strings relative to said body in accordance with said diameters.

14. A guitar, which comprises:
a body,
a plurality of guitar strings,
means to mount said guitar strings in tensioned relationship over said body,
    said strings being disposed generally parallel to each other and generally in a single plane,
a bridge base mounted on said body and adapted to support a plurality of bridge barrels,
adjustment means to effect movement of said bridge base toward and away from said plane of said strings, and a plurality of individual bridge barrels mounted on said bridge base and beneath said strings,
    the axes of said barrels being generally parallel to said plane of said strings,
    each of said bridge barrels being in contact with one only of said strings,
    said bridge barrels having different diameters whereby to vary the distances between said strings and said bridge base, said different diameters and said adjustment means cooperating to determine the elevations of said strings above said body.

15. A guitar, which comprises:

a body, a plurality of guitar strings, means to mount said guitar strings in tensioned relationship over said body, said strings being disposed generally parallel to each other and generally in a single plane, a plurality of individual bridge barrels supported on said body beneath said strings, each of said bridge barrels being in contact with one only of said strings, said bridge barrels having flanges at the ends thereof whereby spool-like bridge elements are provided, said spool-like bridge elements being oriented with the axes thereof transverse to said strings and generally parallel to said plane of said strings, whereby said flanges provide two-point supports for said bridge elements, and means to effect adjustment of said bridge elements in directions longitudinally of said strings.

16. A guitar, which comprises:

a body, a plurality of guitar strings, means to mount said guitar strings in tensioned relationship over said body, said strings being disposed generally parallel to each other and generally in a single plane, screw-mounting means provided on said body, a plurality of screws rotatably mounted in said screw-mounting means, said screws having shanks extending generally longitudinally of said strings, a plurality of solid bridge elements mounted on said body beneath said strings and in supporting relationship relative thereto, each of said bridge elements being in contact with one only of said strings, said bridge elements receiving said shanks of said screws, the relationship between said bridge elements, said screw shanks and said screw-mounting means being such that rotation of said screws effect adjustment of said bridge elements longitudinally of said strings to thereby change the effective lengths thereof, said bridge elements being recessed around said screws on the side of said bridge elements adjacent said screw-mounting means, and a plurality of helical compression springs mounted, respectively, around said screw shanks and seated between said screw-mounting means and said bridge elements, said springs extending into the recesses in said bridge elements whereby to increase the effective distance through which said bridge elements may be adjusted in response to rotation of said screws.

17. A guitar of the type in which a plurality of pairs of strings are provided, the strings in each pair being adjacent each other and in some cases being tuned to a pitch separation of one octave, such strings in each pair being adapted to be pressed simultaneously by a single finger of the guitarist, said guitar comprising:

a body, a plurality of pairs of guitar strings, means to mount said strings in generally parallel relationship relative to each other, and generally in a single plane spaced above said body, and adjustable bridge means to determine the operative length of each individual one of said strings in each individual pair thereof, and also to determine the precise separation between the strings in each pair thereof, said bridge means comprising a separate bridge element for each individual one of said strings, said bridge elements being disposed between said body and said strings in operative engagement with said strings, said bridge means further comprising separator means provided on adjacent ones of said bridge elements and extending upwardly between the strings in each pair thereof to maintain a string separation dependent in part on the locations and thicknesses of said separator means, said bridge means also comprising means to shift each individual one of said bridge elements through a substantial adjustment distance longitudinally of said strings.

18. A guitar of the type in which a plurality of pairs of strings are provided, the strings in each pair being adjacent each other and in some cases being tuned to a pitch separation of one octave, such strings in each pair being adapted to be pressed simultaneously by a single finger of the guitarist, said guitar comprising:

a body, a plurality of pairs of guitar strings, means to mount said strings in generally parallel relationship relative to each other, and generally in a single plane spaced above said body, and adjustable bridge means to determine the operative length of each individual one of said strings in each individual pair thereof, and also to determine the precise separation between the strings in each pair thereof, said bridge means comprising a separate bridge element for each individual one of said strings, said bridge elements being disposed between said body and said strings in operative engagement with said strings, said bridge means further comprising protuberances provided on adjacent ones of said bridge elements and extending upwardly between the strings in each pair thereof to maintain a string separation dependent in part on the locations and thicknesses of said protuberances, said bridge elements and protuberances being so constructed and so related to said string-mounting means that said strings remain in engagement with said protuberances despite movement of said bridge elements longitudinally of said strings through substantial adjustment distances, said bridge means also comprising means to shift each individual one of said bridge elements through a substantial adjustment distance longitudinally of said strings.

19. The invention as claimed in claim 18, in which said adjacent ones of said bridge elements are in guiding engagement with each other, and in which said string-mounting means effects bending of the strings in each pair thereof around said protuberances into convergent relationship, the lateral thrust created by said bending being largely absorbed by the interengaging surfaces of said bridge elements.

20. A single-neck twelve-string guitar, which comprises:

a body, an elongated neck extending from said body and having a head at the outer end thereof, a fixed bridge provided at the end of said neck remote from said body, twelve guitar strings, means to anchor a first set of ends of said guitar strings to said head on the opposite side of said fixed bridge from said body, means to anchor the second set of ends of said guitar strings to said body, said last-named anchor means being such that the anchor points for the first and second ones of said strings lie generally in a first reference plane which extends longitudinally of said neck and generally perpendicular to said body, the anchor points for the third and fourth ones of said strings lie generally in a second reference plane which extends longitudinally of said neck and generally perpendicular to said body, the anchor points for the fifth and sixth ones of said strings lie generally in a third reference plane which extends longitudinally of said neck and generally perpendicular to said body, etc., said strings extending over said fixed bridge in such manner that said first reference plane is disposed between said first and second strings for the full lengths of the operative playing portions thereof, said second reference plane is disposed between said third and fourth strings for the full lengths of the operative playing portions thereof, said third reference plane is disposed between said fifth and sixth strings for the full lengths of the operative playing portions thereof, etc., adjustable bridge means mounted on said body beneath said strings and relatively adjacent said anchor points for said second set of ends of said strings, said adjustable bridge means including twelve individual bridge elements supported on said body and each engaging and supporting one only of said strings, the first and second ones of said individual bridge elements each including a separator element extending upwardly between said first and second ones of said strings to maintain said first and second strings separated by a predetermined desired distance despite the fact that the anchor points for said first and second strings are generally in said second reference plane, the third and fourth ones of said individual bridge elements each including a separator element extending upwardly between said third and fourth ones of said strings to maintain said third and fourth strings separated by a predetermined desired distance despite the fact that the anchor points for said third and fourth strings are generally in said second reference plane, the fifth and sixth ones of said individual bridge elements each including a separator element extending upwardly between said fifth and sixth ones of said strings to maintain said fifth and sixth strings separated by a predetermined desired distance despite the fact that the anchor points for said fifth and sixth strings are generally in said third reference plane, etc., and means to adjust each individual one of said bridge elements longitudinally of said strings to thereby vary the length of the operative playing portion of the associated string.

21. The invention as claimed in claim 20, in which said individual bridge elements are disposed in a row in guiding abutment with each other, said row extending transversely of said strings, and in which means are provided on said body to prevent movement of said row of bridge elements transversely of said strings, whereby said bridge elements may each move longitudinally of said strings but not transversely thereof.

22. The invention as claimed in claim 21, in which at least substantial numbers of said individual bridge elements have dimensions in a direction longitudinally of said row which are less than the dimensions thereof in directions perpendicular to said guitar body.

23. The invention as claimed in claim 20, in which said means to adjust said bridge elements comprises screw-mounting means provided on said guitar body on the opposite side of said anchor points from said neck, twelve screws extending rotatably through said screw-mounting means toward said neck and having head portions disposed remote from said neck, the shanks of said screws being inserted, respectively, into said individual bridge elements in such relationship that rotation of said screws effects said longitudinal adjustment of said bridge elements, the shanks of the first and second ones of said screws being disposed on opposite sides of said first reference plane, the shanks of the third and fourth ones of said screws being disposed on opposite sides of said second reference plane, the shanks of the fifth and sixth ones of said screws being disposed on opposite sides of said third reference plane, etc.

24. The invention as claimed in claim 20, in which each of said individual bridge elements comprises a cylindrical spool having flanges at opposite ends thereof, the flange at one end of each spool forming said separator element, said flanges effecting stable support of the individual spools on said guitar body.

25. The invention as claimed in claim 20, in which a vertically-adjustable bridge base is provided on said guitar body and serves as the support for said individual bridge elements, whereby the height of said strings above said body may be adjusted by raising or lowering said bridge base.

26. The invention as claimed in claim 25, in which each of said individual bridge elements comprises a right cylinder having the axis thereof oriented transversely of said strings, the cylinders for different ones of said strings having different diameters whereby to vary the spacing of said strings above the guitar body.

27. The invention as claimed in claim 20, in which said guitar body is solid, in which said means to anchor said second set of ends of said strings to said guitar body includes bores provided through said body, said strings being extended through said bores, and in which means are provided on the opposite side of said body from said adjustable bridge means to prevent movement of the extreme ends of said strings through said bores, whereby said anchor points are formed at the ends of said bores on the face of said body.

28. A single-neck twelve-string electric guitar, which comprises:

a guitar body, a neck extending from said body and having a head at the outer end thereof, a fixed bridge provided at the end of said neck remote from said body, a vertically-movable bridge base provided on said body transversely of the axis of said neck, said bridge base including adjustable means to raise and lower said bridge base relative to said body, said bridge base further including abutment means to define fixed guide surfaces generally parallel to said neck axis and generally perpendicular to said body, said fixed guide surfaces being substantially parallel to each other and being spaced a sufficient distance apart to permit all guitar strings to extend therebetween, twelve spools each having a cylindrical body and having flanges at opposite ends thereof, said spools being provided in a row on said bridge base and in end-to-end abutment, the end ones of said spools abutting said guide surfaces whereby said guide surfaces and said abutment between adjacent spools prevent movement of said spools in a direction lateral to said neck axis, said spools having different diameters whereby to support guitar strings at different elevations above said bridge base, screw-mounting means provided on said body in spaced relationship from said bridge base,
said screw-mounting means being disposed on the opposite side of said bridge base from said neck,
twelve elongated adjustment screws extended through said screw-mounting means toward said neck and threaded, respectively, into said spools diametrically thereof,
said screws being generally parallel to each other and being generally in a single plane,
said screws extending through openings in said screw-mounting means sufficiently large to permit pivoting of said screws in response to raising and lowering of said bridge base,
the heads of said screws being disposed on the opposite sides of said bridge base from said screw-mounting means,
twelve guitar strings connected, respectively, to said head and extending over said fixed bridge,
said strings having operative playing portions lying generally in a single plane,
said strings extending, respectively, over said spools between said flanges thereon whereby rotation of said screws effects adjustment of the lengths of said operative playing portions of said strings,
means to anchor to said body the end of the two of said strings most adjacent one of said fixed guide surfaces and at points between the adjustment screws for the two spools closest to such fixed guide surface,
means to anchor to said body the ends of the third and fourth ones of said strings at points between the third and fourth adjustment screws,
means to anchor to said body the ends of the fifth and sixth ones of said strings at points between the fifth and sixth adjustment screws,
means to anchor to said body the ends of the seventh and eighth ones of said strings at points between the seventh and eighth adjustment screws,
means to anchor to said body the ends of the ninth and tenth ones of said strings at points between the ninth and tenth adjustment screws, and
means to anchor to said body the ends of the eleventh and twelfth ones of said strings at points between the eleventh and twelfth adjustment screws.

29. An acoustic guitar, which comprises:
a hollow wooden body having a neck projecting therefrom and a head at the outer end of said neck,
a fixed bridge provided at the end of said neck adjacent said head,
six guitar strings connected to tuning screws on said head and extending over said fixed bridge and said neck to said body,
said strings having operative playing portions lying generally in a single plane and generally parallel to each other,
screw-mounting means provided on the face of said guitar body transversely of the axis of said neck,
six individual bridge elements supported on said body between said screw-mounting means and said neck,
each of said individual bridge elements supporting one only of said strings,
six elongated screws disposed generally in a single plane parallel to the face of said guitar body,
said screws being generally parallel to each other,
said screws extending through openings in said screw-mounting means and being inserted, respectively, into said bridge elements in such relationship that turning of said screws effects adjustment of said bridge elements longitudinally of said strings,
each of said screws being disposed at an acute angle, when viewed from a plane parallel to said plane containing said operative playing portions of said strings, relative to the string which extends over the bridge element through which such screw is inserted, and
means to anchor each of said strings to said guitar body at a point on the opposite side of said bridge element from said neck and between said bridge element and said screw-mounting means,
said anchor points being in each instance located laterally of said screws,
said anchor points for five of said screws being disposed between the shanks of said screws,
whereby the inoperative portions of said strings between said bridge elements and said anchor points are very short and lie in the same planes, which are perpendicular to said plane containing said operative playing portions of said strings, as said operative playing portions of said strings, and whereby said bridge elements may be readily adjusted without interference from said strings.

30. The invention as claimed in claim 29, in which said bridge elements are cylindrical barrels aligned in a row transverse to said strings and in end-to-end abutment, and in which said screws are oriented at substantial acute angles relative to the axes of said barrels.

31. The invention as claimed in claim 29, in which said means to anchor said strings to said body comprises openings formed in said body between said screws and receiving the ends of said strings, eyelets provided at the ends of said strings and interiorly of said body, and pins frictionally mounted in said openings to prevent shifting of said eyelets therethrough.

32. The invention as claimed in claim 29, in which said means to anchor said strings to said body comprises openings formed in said screw-mounting means between the heads of said screws, the string ends being inserted through said opening, and in which knots are tied in said string ends around said screw-mounting means.

33. A guitar, which comprises:
a guitar body,
a neck extending outwardly from said body and having a head at the outer end thereof,
vibrato means provided on said body,
tuning screws provided on said head,
a plurality of strings extending between said tuning screws and said vibrato means,
said strings being generally parallel to each other,
said strings lying generally in a single plane parallel to the face of said body, and
a bridge construction mounted on said body beneath said strings and adjacent said vibrato means,
said bridge construction comprising a bridge base having legs pivotally associated with said body to permit pivotal movement of said bridge base about an axis generally parallel to said plane of said strings and extending transverse to said strings,
such pivotal movement resulting from variations in the tension of said strings in response to operation of said vibrato means,
said bridge construction further comprising a plurality of individual bridge elements supported on said bridge base and each engaging one only of said strings,
said bridge elements comprising spools having cylindrical bodies engaged with said strings and having annular flanges at the ends of said bodies, said flanges seating on said bridge base to provide two-point support for said spools,
said bridge construction further comprising screws extending rotatably through said bridge base and through said spools in such manner that rotation of said screws effects adjustment of said spools longitudinally of said strings to thus change the effective lengths thereof.

34. The invention as claimed in claim 33, in which said legs of said bridge base are adjustable in order to raise and lower said bridge base relative to said guitar body, and in which said spools are in endwise abutment relative to each other.

35. The invention as claimed in claim 33, in which an annular groove is formed in each of said spools in order to receive an associated string and prevent lateral shifting thereof.

36. The invention as claimed in claim 33, in which spring means are provided around said screws and are extended into counterbores in said spools, said spring means comprising helical compression springs seated between said spools and a portion of said bridge base, said screws being rotatably mounted in said portion of said bridge base and being threadedly associated with said spools.

37. An adjustable bridge for a single-neck twelve-string guitar, having a body, an elongated neck extending from said body, a fixed bridge provided at the end of said neck remote from said body, twelve guitar strings, means to anchor a first set of ends of said guitar strings to the head of said guitar on the opposite side of said fixed bridge from said body, and means to anchor the second set of ends of said guitar strings to said body, said adjustable bridge comprising:

twelve individual bridge elements supported on said body and each engaging and supporting one only of said strings,
the first and second ones of said individual bridge elements each including a separator element extending upwardly between the first and second ones of said strings to maintain said first and second strings separated by a predetermined desired distance, the third and fourth ones of said individual bridge elements each including a separator element extending upwardly between said third and fourth ones of said strings to maintain said third and fourth strings separated by a predetermined desired distance, etc., and
means to adjust each individual one of said bridge elements longitudinally of said strings to thereby vary the length of the operative playing portion of the associated string.

38. The invention as claimed in claim 37, in which said bridge elements are disposed in a row extending transverse to said strings, said bridge elements being in guiding abutment with each other, and in which abutment means are provided to engage the bridge elements of the ends of said row and thus prevent movement of said row transversely of said strings.

39. The invention as claimed in claim 38, in which said bridge elements are barrels having flanges at the ends thereof and forming said separator elements, in which said barrels are supported on a vertically-adjustable bridge base, and in which said adjustment means comprises a plurality of screws extending, respectively, through said barrels.

40. A stringed musical instrument of the guitar type which comprises:
a body having a face,
a neck connected to said body and having a head at the outer end thereof.
a plurality of strings mounted over said body and neck and anchored to said body and to said head, and
an adjustable bridge mounted on said body beneath said strings,
said bridge including a plurality of individual bridge elements in supporting contact, respectively, with said strings,
said bridge further including a plurality of screws associated, respectively, with said bridge elements to adjust the same longitudinally of said strings,
said screws being disposed in planes which are parallel to each other and are perpendicular to said face,
said planes containing said screws being disposed at acute angles relative to planes which contain, respectively, the inoperative string portions located between said bridge elements and said body, said last-named planes also being perpendicular to said face.

41. The invention as claimed in claim 40, in which the operative string portions lying between said bridge elements and said neck are generally in a single plane parallel to said face, and in which said inoperative string portions are disposed at acute angles to said single plane.

References Cited by the Examiner

UNITED STATES PATENTS

| | | | |
|---|---|---|---|
| 1,595,798 | 8/1926 | Marino | 84—299 |
| 2,573,254 | 10/1951 | Fender | 84—307 |
| 2,813,448 | 11/1957 | Robinson | 84—299 |
| 2,972,923 | 2/1961 | Fender | 84—307 |

RICHARD B. WILKINSON, *Primary Examiner.*